(12) United States Patent
Asiri et al.

(10) Patent No.: US 10,888,845 B1
(45) Date of Patent: Jan. 12, 2021

(54) GRAPHENE-TUNGSTEN OXIDE-METAL BORIDE/HYDROXIDE PHOTOCATALYSTS, AND METHODS FOR ORGANIC POLLUTANT DEGRADATION AND HYDROGEN PRODUCTION

(71) Applicant: King Abdulaziz University, Jeddah (SA)

(72) Inventors: Abdullah Mohamed Asiri, Jeddah (SA); Muhammad Bilal Tahir, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/944,785

(22) Filed: Jul. 31, 2020

Related U.S. Application Data

(60) Provisional application No. 63/053,087, filed on Jul. 17, 2020.

(51) Int. Cl.
*B01J 21/02* (2006.01)
*B01J 23/755* (2006.01)
(Continued)

(52) U.S. Cl.
CPC ........... *B01J 23/888* (2013.01); *B01J 35/004* (2013.01); *B01J 35/0013* (2013.01);
(Continued)

(58) Field of Classification Search
CPC .. B01J 23/888; B01J 35/0013; B01J 35/0033; B01J 35/004; B01J 35/1014;
(Continued)

(56) References Cited

U.S. PATENT DOCUMENTS

| | | | |
|---|---|---|---|
| 2002/0013221 A1* | 1/2002 | Thompson | H01M 8/0612 502/177 |
| 2010/0167914 A1* | 7/2010 | Anderson | B01J 23/42 502/80 |

(Continued)

FOREIGN PATENT DOCUMENTS

| | | | | |
|---|---|---|---|---|
| CN | 10 4402056 | * | 3/2015 | ............. B82Y 30/00 |
| CN | 104056620 B | | 8/2016 | |

(Continued)

OTHER PUBLICATIONS

An Tran Doan et al., "Graphitic g-C3N4-WO3 Composite: Synthesis and Photocatalytic Properties." Bulletin of Korean Chemical Society, vol. 35, No. 6, pp. 1794-1798. (Year: 2014).*

(Continued)

*Primary Examiner* — Patricia L. Hailey
(74) *Attorney, Agent, or Firm* — Oblon, McClelland, Maier & Neustadt, L.L.P.

(57) ABSTRACT

A composite photocatalyst, a method of producing said composite photocatalyst, a method of degrading an organic pollutant using the composite photocatalyst, and a method of producing hydrogen using the composite photocatalyst. The composite photocatalyst includes graphene, tungsten oxide, a metal boride, and a metal hydroxide. The photocatalyst is capable of degrading an organic pollutant when exposed to light. The photocatalyst is also capable of producing hydrogen from water when exposed to light under suitable conditions.

20 Claims, 6 Drawing Sheets

(51) Int. Cl.

| | |
|---|---|
| *C01B 32/182* | (2017.01) |
| *B01J 23/888* | (2006.01) |
| *C02F 1/72* | (2006.01) |
| *B01J 35/00* | (2006.01) |
| *B01J 35/10* | (2006.01) |
| *B01J 37/04* | (2006.01) |
| *B01J 37/34* | (2006.01) |
| *C01B 3/04* | (2006.01) |
| *C02F 1/30* | (2006.01) |
| *C02F 101/30* | (2006.01) |

(52) U.S. Cl.
CPC ....... *B01J 35/0033* (2013.01); *B01J 35/1014* (2013.01); *B01J 35/1019* (2013.01); *B01J 35/1038* (2013.01); *B01J 37/04* (2013.01); *B01J 37/345* (2013.01); *C01B 3/042* (2013.01); *C02F 1/30* (2013.01); *C02F 1/725* (2013.01); *C02F 2101/308* (2013.01); *C02F 2305/08* (2013.01); *C02F 2305/10* (2013.01)

(58) Field of Classification Search
CPC .... B01J 35/1019; B01J 35/1038; B01J 37/04; B01J 37/345; B01J 21/02; B01J 23/755; C01B 3/042; C01B 32/182; C02F 1/30; C02F 1/725; C02F 2101/308; C02F 2305/08; C02F 2305/10
USPC .... 502/5, 182, 185, 202, 204, 207, 305, 315
See application file for complete search history.

(56) References Cited

U.S. PATENT DOCUMENTS

| | | | |
|---|---|---|---|
| 2011/0045964 A1* | 2/2011 | Abe ............... | B01J 23/6527 502/5 |
| 2012/0189681 A1* | 7/2012 | Macedo Tavares ... | A01N 25/18 424/408 |
| 2013/0180932 A1* | 7/2013 | Fukumura ............ | B01J 23/30 210/749 |
| 2015/0306570 A1* | 10/2015 | Mayes ............... | C02F 1/4691 424/125 |
| 2019/0078404 A1* | 3/2019 | Murugesan ......... | B01D 19/0084 |

FOREIGN PATENT DOCUMENTS

| | | | | |
|---|---|---|---|---|
| CN | 10 6872063 | * | 6/2017 | .............. B01J 23/30 |
| CN | 10 7715881 | * | 2/2018 | .............. B01J 21/18 |
| CN | 10 8003669 | * | 5/2018 | .............. C09D 1/00 |
| CN | 10 8128806 | * | 6/2018 | ........... C01B 32/184 |
| CN | 10 8726640 | * | 11/2018 | .............. C02F 1/461 |
| CN | 108855047 A | | 11/2018 | |
| CN | 10 9665718 | * | 4/2019 | ............. C03C 17/00 |
| EP | 2 647 430 B1 | | 7/2015 | |
| KR | 10-2013-0022960 | | 3/2013 | |
| WO | 2011/132036 A1 | | 10/2011 | |

OTHER PUBLICATIONS

Lu Gan et al., "Visible light induced methylene blue dye degradation photo-catalyzed by WO3/graphene nanocomposites and the mechanism." Ceramics International 42, pp. 15235-15241. (Year: 2016).*

Adel A. Ismail et al., "Mesoporous WO3-graphene photocatalyst for photocatalytic degradation of Methylene Blue dye under visible light illumination." Journal of Environmental Sciences 66, pp. 328-337. (Year: 2018).*

Nurul Nabila Rosman et al., "Photocatalytic properties of two-dimensional graphene and layered transition-metal dichalcogenides based photocatalyst for phtoelectrochemical hydrogen generation: An overview." International Journal of Hydrogen Energy 43, pp. 18925-18945. (Year: 2018).*

Sai Zhang et al., "Recent developments of two-dimensional graphene-based composites in visible light photocatalysis for eliminating persistent organic pollutants from wastewater." Chemical Engineering Journal 390, pp. 1-24. (Year: 2020).*

Tong, et al. ; Facile preparation of amorphous carbon-coated tungsten trioxide containing oxygen vacancies as photocatalysts for dye degradation ; J Mater Sci (2019) ; 14 Pages.

Azimirad, et al. ; Preparation of three dimensional graphene foam-WO3 nanocomposite with enhanced visible light photocatalytic activity ; Materials Chemistry and Physics 162 ; 2015 ; 6 Pages.

Hameed, et al. ; Effect of transition metal doping on photocatalytic activity of WO3 for water splitting under laser illumination: role of 3d-orbitals ; Catalysis Communications 5 ; 2004 ; 5 Pages.

Shahzad, et al. ; Engineering the performance of heterogeneous WO3/fullerene@Ni3B/Ni(OH)2 Photocatalysts for Hydrogen Generation ; International Journal of Hydrogen Energy vol. 44, Issue 39 ; Aug. 13, 2019 ; 2 Pages; Abstract.

* cited by examiner

GRAPHENE-TUNGSTEN OXIDE-METAL BORIDE/HYDROXIDE PHOTOCATALYSTS, AND METHODS FOR ORGANIC POLLUTANT DEGRADATION AND HYDROGEN PRODUCTION

CROSS-REFERENCE TO RELATED APPLICATION

This application claims the benefit of U.S. Provisional Patent Application No. 63/053,087 filed Jul. 17, 2020, which is incorporated herein by reference in its entirety.

STATEMENT OF PRIOR DISCLOSURE BY THE INVENTORS

Aspects of this technology are described in the article "Engineering the performance of heterogeneous $WO_3$/fullerene@$Ni_3B$/$Ni(OH)_2$ Photocatalysts for Hydrogen Generation" published in International Journal of Hydrogen Energy, 2019, Vol. 44, Issue 39, available on Jul. 17, 2019, which is incorporated herein by reference in its entirety.

BACKGROUND OF THE INVENTION

Field of the Invention

The present disclosure relates to a nanocomposite photocatalyst, a method of making said composite photocatalyst, a method of degrading an organic pollutant using said composite photocatalyst, and a method of producing hydrogen using said photocatalyst.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Production of green energy and wastewater treatment are two issues that require significant attention currently and in coming years due to growing energy needs and environmental contamination [Tahir M. B., et. al., International Journal of Environmental Science and Technology, 2017, 14, 2519-2542]. Organic and biological pollutants present in wastewater can be very toxic and harmful to both humans and aquatic organisms. As a result, water pollution has become a pressing issue because of its association with various diseases, such as cancer, hepatic dysfunction, developmental disorders, and disruption of the endocrine system [Janitabar-Darzi, S and Mahjoub, A. R., J. Alloys Compd., 2009, 486, 805-808]. Both the production of green energy and the treatment of wastewater to remove pollutants are currently receiving much attention [Guo Y., et. al., Appl. Surf. Sci., 2010, 256, 2215-2222]. Hydrogen ($H_2$) production is a promising way for producing low cost, non-polluting and storable energy from water [Rajeshwar K., et. al., Journal of Photochemistry and Photobiology C: Photochemistry Reviews, 2008, 9, 171-192]. A method of simultaneously removing organic or biological contaminants and producing hydrogen from water would be a significant advance toward providing both green energy and a means for treating wastewater.

Significant research work has been carried out to resolve wastewater contamination issues through various biological, chemical and physical methods [Cruz AM-dl., et. al., Solid State Sci., 2010, 12, 88-94; and Gan L., et. al., Ceram. Int., 2016, 42, 14, 15235-15241]. However, many of the methods proposed are limited by the use of costly and inefficient processes that cannot degrade organic contaminants like dyes completely, that generate by-products, and/or that require high-temperatures [Zhang X., et. al., Chem. Commun., 2011, 47, 20, 5804-5806; and Xue Q., et. al., Chem. Eng. J., 2016, 283, 614-621]. Efficient and robust visible light photocatalysts are attractive for solving these wastewater issues [Fakhri A, and Behrouz S., Sol. Energy, 2015, 112, 163-168]. Numerous semiconductors like sulfides, carbides, and nitrides have been synthesized using different techniques. These materials showed high photocatalytic activity in the presence of visible light irradiation [Xie J., et. al., Ceram. Int., 2014, 40, 8, 12519-12524; and Zhang, S. and Song, L., Catal. Commun., 2009, 10, 1725-1729]. However, inappropriate reduction potential, low efficiency, limited usable wavelength range, and rapid recombination of photogenerated charge carriers limit their use for photocatalytic applications [Xi G., et. al., Chem. A Eur. J., 2012, 18, 44, 13949-13953]. Therefore, there remains a need for an efficient development method for the ordered design of metal oxide photocatalytic materials that are more responsive to a broader light spectrum for large-scale photocatalytic applications.

Tungsten trioxide ($WO_3$), among semiconductor materials, is attractive for photocatalytic applications because of its unique properties such as wide range of indirect band gap (~2.4-2.8 eV), n-type, stable physiochemical properties, high absorption within the visible portion of the solar spectrum, and photo-corrosion resilience [Fakhri A, and Behrouz S., Sol. Energy, 2015, 112, 163-168]. Furthermore, it has many potential applications in air cleaning, heavy metal remediation, environment cleaning, gas sensing, water splitting and dyes degradation [Wang C., et. al., Sens. Actuat. B Chem., 2015, 210, 75-81; and Vamvasakis I., et. al., J. Sol-Gel Sci. Technol., 2015, 76, 1, 120-128]. However, a rapid recombination rate and low reduction potential make pure $WO_3$ less efficient under visible light irradiation which limits its practical application as a photocatalyst for large-scale applications [Sun W., et. al., Nano Lett., 2015, 15, 7, 4834-4838]. Recently, researchers have increased the photocatalytic activity of $WO_3$ by tuning the position of valence and conduction bands, making charge separation rapid and efficient, controlling morphology, and increasing the number of reaction sites through doping, coupling, and hybridization [Sudrajat H., and Babel, S., Environ. Chem. Lett., 2016, 14, 243-249; and Theerthagiri J., et. al., RSC Adv., 2015, 5, 65, 52718-52725].

Co-catalysts can play a significant role in effective separation of photogenerated charge-carriers and simultaneously lowering the activation energy for $H_2$ production [Smith W., et. al., J. Mater. Chem., 2011, 21, 29, 10792-10800]. However, high cost and a narrow range of established co-catalysts make the use of co-catalysts difficult for commercialization [Shiraishi Y., et. al., Catal. Sci. Technol., 2012, 2, 2, 400-405]. Therefore, the development of efficient and cost-competitive composite materials to replace Pt, Eu, CdS, ZnO, and $TiO_2$ in energy harvesting devices has become critical for commercial applications [Shi J., et. al., N. J. Chem., 2013, 37, 5, 1538-1544]. In this regard carbon-based materials have gained significant attention because of their high electrical conductivity, exceptional assembly and high surface area [Xie, Y., and Yuan, C., Applied Catalysis B:

Environmental, 2003, 46, 251-259]. Specifically, graphene is a promising and potentially applicable co-catalyst in nano-electronics, solar cells, photocatalysis, and electro-chemistry [Zhu, X., et. al, J. Mater. Sci.: Mater. Electron., 2017, 28, 12158-12167]. Graphene is a 2D single layer material having advantageous properties for use in catalysis, including a large specific surface area, chemically and thermally stability and high electron mobility [Pudukudy, M., et. al., Der Pharma Chemica, 2013, 5, 208-212]. Moreover, properties such as high electrical conductivity, optical transmission, and large surface area favor graphene for the exchange of negatively charged carriers from the conduction band (CB) of a photocatalyst [Kumar, S. G., and Rao, K. S. R. K., Appl. Surf. Sci., 2015, 355, 939-958; and Szilágyi, I. M., et. al., J. Catal., 2012, 294, 119-1271.

To date, graphene containing metal oxide composites have been demonstrated for $H_2$ generation and photocatalytic activity only separately [Villa, K., et. al., Appl. Catal. B, 2016, 187, 30-36; Lee, H., et. al., Appl. Catal. B, 2013, 138, 311-317; and Tahir, M. B., et. al., J. Inorg. Organomet. Polym., 2018, 28, 777-782]. However, there has been no demonstration of both of these capabilities in a single composite. Further, there has been no combination of metal oxides, graphene, and non-oxide metal-containing materials to achieve this capability.

In view of the forgoing, one object of the present disclosure is to provide a composite photocatalyst comprising a metal oxide, graphene, and a non-oxide metal-containing material which shows activity as a photocatalyst for organic pollutant degradation in aqueous solution and for hydrogen production from water.

SUMMARY OF THE INVENTION

The present disclosure relates to a composite photocatalyst comprising catalytic nanoparticles comprising tungsten oxide and graphene, and co-catalyst nanoparticles comprising a transition metal boride and a transition metal hydroxide disposed upon the catalytic nanoparticles.

In some embodiments, the tungsten oxide is monoclinic $WO_3$.

In some embodiments, the tungsten oxide is crystalline by PXRD and has a mean crystallite size of 0.5 to 25 nm by PXRD.

In some embodiments, the graphene is present in the catalytic nanoparticles in an amount of 0.25 to 10 wt %, based on a total weight of the catalytic nanoparticles.

In some embodiments, the transition metal boride has a formula of $M_3B$ where M is a transition metal.

In some embodiments, the transition metal boride is nickel boride having a formula of $Ni_3B$.

In some embodiments, the transition metal hydroxide has a formula $M'(OH)_2$ where M' is a transition metal.

In some embodiments, the transition metal hydroxide is nickel hydroxide having a formula of $Ni(OH)_2$.

In some embodiments, the co-catalyst nanoparticles are present in an amount of 0.25 to 10 wt % based on a total weight of composite photocatalyst.

In some embodiments, the composite photocatalyst is in the form of particles having a mean particle size of 2 to 150 nm by electron microscopy.

In some embodiments, the composite photocatalyst has a BET surface area of 75 to 150 $m^2/g$ and a mean pore volume of 0.05 to 0.15 $cm^3g^{-1}$.

In some embodiments, the composite photocatalyst has a band gap of 2.25 to 2.60 eV.

The present disclosure also relates to method of preparing the composite photocatalyst of claim 1, the method comprising dispersing catalytic particles comprising tungsten oxide and graphene in a first precursor solution comprising a first transition metal halide, adding a reducing agent solution comprising a borohydride reducing agent and a hydroxide base to the first precursor solution and stirring to form a boride-containing product, dispersing the boride-containing product in a second precursor solution comprising a second transition metal halide, a hypophosphite salt, and an aminoalcohol to form a photoreaction mixture irradiating the photoreaction mixture with UV and visible light for 5 to 60 minutes to form the composite photocatalyst, and collecting the composite photocatalyst.

In some embodiments, the first transition metal halide and second transition metal halide are nickel (II) chloride, the borohydride reducing agent is sodium borohydride, the hydroxide base is sodium hydroxide, the hypophosphite salt is sodium hypophosphite, the aminoalcohol is triethanolamine, and the photoreaction mixture is irradiated with a xenon lamp operated at a power of 250 to 350 W.

The present disclosure also relates to a method of degrading an organic pollutant, the method comprising contacting a solution comprising the organic pollutant with the composite photocatalyst of claim 1 to form a catalytic mixture, and irradiating the catalytic mixture with visible light for 1 to 180 minutes.

In some embodiments, the organic pollutant is at least one selected from the group consisting of chloramphenicol, tetracycline, methotrexate, methylene orange, methylene blue, crystal violet, and Rhodamine-B.

In some embodiments, the composite photocatalyst is present in the catalytic mixture in an amount of 0.05 to 0.5 mg/mL In some embodiments, the organic pollutant is methylene blue, and the method degrades greater than 95% of an initial amount of methylene blue after irradiating for 75 to 105 minutes.

The present disclosure also relates to a method of producing hydrogen gas comprising exposing a mixture comprising the composite photocatalyst of claim 1 and water to visible light, and collecting hydrogen gas.

In some embodiments, the method produces hydrogen gas at a rate of 250 to 750 mmol $H_2$ per hour per gram of composite photocatalyst.

BRIEF DESCRIPTION OF THE DRAWINGS

FIG. 1A is of nanoparticulate $WO_3$, and FIGS. 1B-1F are graphene-$WO_3$ composites with various amounts of $Ni_3B/Ni(OH)_2$, with FIG. 1B having 0 wt % $Ni_3B/Ni(OH)_2$, FIG. 1C having 1 wt % $Ni_3B/Ni(OH)_2$, FIG. 1D having 1.5 wt % $Ni_3B/Ni(OH)_2$, FIG. 1E having 2.0 wt % $Ni_3B/Ni(OH)_2$, and FIG. 1 having 2.5 wt % $Ni_3B/Ni(OH)_2$;

FIG. 2A depicts graphene used in the preparation of the composite photocatalysts, FIG. 2B is $WO_3$ used in the preparation of the composite photocatalysts, FIG. 2C is a graphene-$WO_3$ composite having 2.0 wt % $Ni_3B/Ni(OH)_2$, and FIG. 2D is a graphene-$WO_3$ composite having 2.5 wt % $Ni_3B/Ni(OH)_2$;

FIG. 5A shows absorbance spectra for prepared composite photocatalysts and FIG. 5B shows photoluminescence spectra for prepared composite photocatalysts;

FIG. 6A is for tetracycline (TC), FIG. 6B is for chloramphenicol (C), FIG. 6C is for methotrexate (MT), FIG. 6D is for methylene orange (MO), FIG. 6E is for methylene blue (MB), FIG. 6F is for crystal violet (CV), and FIG. 6F is for rhodamine B (RhB);

DETAILED DESCRIPTION OF THE INVENTION

Figure 1A:
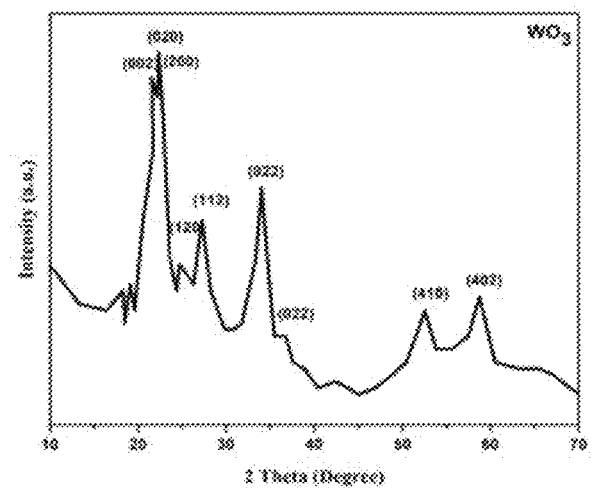
FIGS. 1A-1F are PXRD patterns of composite photocatalysts where
Figure 1B:
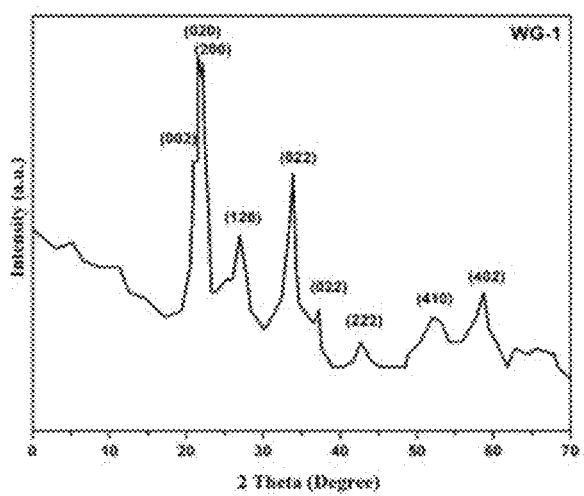
Figure 1C:
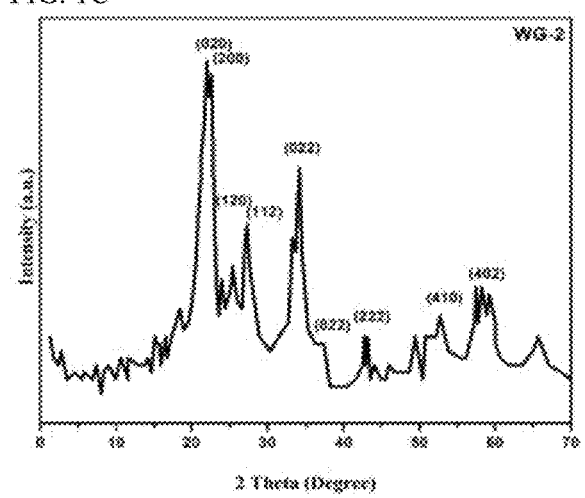
Figure 1D:
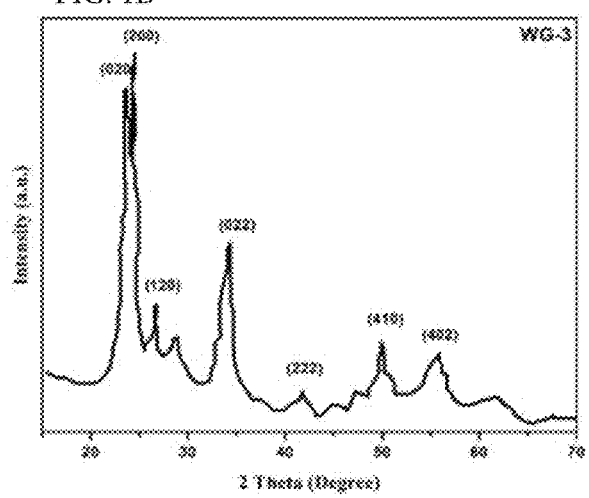
Figure 1E:
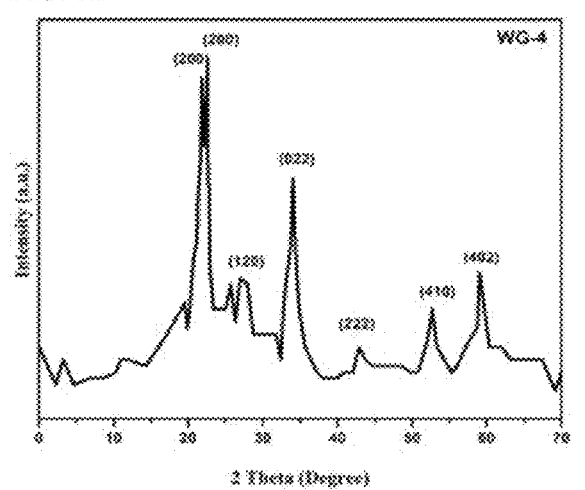
Figure 1F:
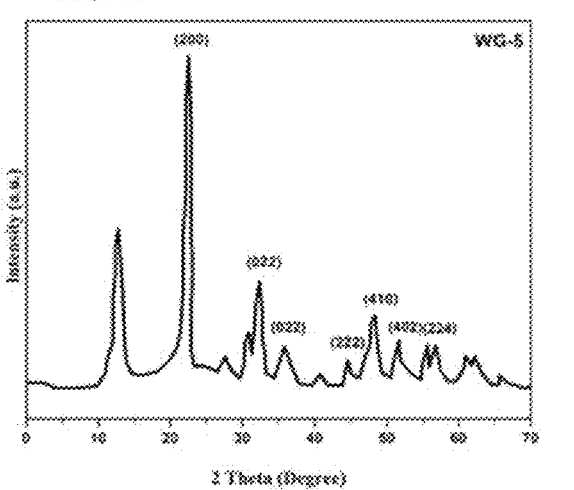

In the following description, it is understood that other embodiments may be utilized and structural and operational changes may be made without departure from the scope of the present embodiments disclosed herein.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of nickel include $^{58}$Ni, $^{60}$Ni, $^{61}$Ni, $^{62}$Ni, and $^{64}$Ni. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a composite photocatalyst comprising catalytic nanoparticles comprising tungsten oxide and graphene and co-catalyst nanoparticles comprising a transition metal boride and a transition metal hydroxide disposed upon the catalytic nanoparticles.

Tungsten oxide exists in several forms with different tungsten oxidation states and different stoichiometries. Examples of tungsten oxides include tungsten(III) oxide (W$_2$O$_3$), tungsten(IV) oxide (WO$_2$, also known as tungsten dioxide), tungsten(VI) oxide (WO$_3$, also known as tungsten trioxide), and tungsten pentoxide (W$_{18}$O$_{49}$, also called mineral blue). In preferred embodiments, the tungsten oxide is tungsten trioxide (WO$_3$). Tungsten trioxide exists in multiple polymorphs which have different crystal structures including monoclinic WO$_3$, tetragonal WO$_3$, and triclinic WO$_3$. While any of these polymorphs may be used, in preferred embodiments, the tungsten oxide is monoclinic WO$_3$.

In some embodiments, the tungsten oxide is crystalline. The crystallinity may be determined by any technique known to one of ordinary skill in the art. Examples of such techniques for determining crystallinity include, but are not limited to, powder X-ray diffraction (PXRD), single crystal X-ray diffraction, electron diffraction, high resolution transmission electron microscopy, and neutron diffraction. In preferred embodiments, the crystallinity is determined by PXRD. In some embodiments, the tungsten oxide is crystalline with a mean crystallite size of 0.5 to 25 nm, preferably 1 to 22.5 nm, preferably 2.5 to 20 nm, preferably 5 to 19 nm, preferably 7 to 17 nm. The crystallite size may be determined using a technique known to one of ordinary skill in the art such as calculation from PXRD, calculation from neutron diffraction, and direct observation via electron microscopy. Calculation of crystallite size from PXRD is typically accomplished through the use of the Scherrer equation, which relates the full-width at half-maximum of the diffraction peaks in the PXRD pattern of the material to the mean crystallite size of the material. In some embodiments, the crystallite size is determined by PXRD. In some embodiments, the determination of crystallite size by PXRD is accomplished by the determination of the full-width at half-maximum of one or more PXRD signals and the calculation of crystallite size using said full-width at half-maximum using the Scherrer equation.

In some embodiments, the tungsten oxide is present as particles. In some embodiments, the tungsten oxide particles have a mean particle size of 0.5 to 149 nm, preferably 1 to 125 nm, preferably 2.5 to 120 nm, preferably 5 to 115 nm, preferably 9 to 100 nm. In some embodiments, the tungsten oxide particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the tungsten oxide particles may be substantially spherical, meaning that the distance from the particle centroid (center of mass) to anywhere on the particle outer surface varies by less than 30%, preferably by less than 20%, more preferably by less than 10% of the average distance. In some embodiments, the tungsten oxide particles are in the form of blocks, granules, terraced rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150%, preferably 10 to 125%, preferably 15 to 100%, preferably 25 to 75% of the range previously described. In some embodiments, the tungsten oxide particles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean diameter of the primary particles. The primary particles may be the tungsten oxide particles having a mean size as previously described. In some embodiments, the tungsten oxide particles are monodisperse, having a coefficient of variation or relative standard deviation, expressed as a percentage and defined as the ratio of the particle size standard deviation ($\sigma$) to the particle size mean ($\mu$), multiplied by 100%, of less than 25%, preferably less than 10%, preferably less than 8%, preferably less than 6%, preferably less than 5%. In a preferred embodiment, the tungsten oxide particles are monodisperse, having a particle size distribution ranging from 80% of the mean particle size to 120% of the average particle size, preferably 85 to 115%, preferably 90 to 110% of the mean particle size. In another embodiment, the tungsten oxide particles are not monodisperse.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In some embodiments, the graphene is graphene oxide. Graphene oxide refers to the graphene which contains oxygen-containing functional groups such as hydroxide, phenol, carbonyl, carboxyl, and epoxide groups. Graphene oxide is sometimes considered to be a type of functionalized graphene. Typically, graphene oxide has a carbon-to-oxygen atomic ratio of about 2 to 3, preferably about 2.1 to 2.9, preferably about 2.2 to 2.8, preferably about 2.25 to 2.75. In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, having a carbon-to-oxygen atomic ratio greater than about 3, preferably greater than about 4, preferably greater than about 5, preferably greater than about 7.5, preferably greater than about 10, preferably greater than about 25. Reduced graphene oxide is distinct from pristine graphene by the presence of oxygen-containing functionalities and structural defects in the carbon network. Reduced graphene oxide is sometimes considered to be a type of functionalized graphene.

In some embodiments, the graphene is monolayer graphene. Monolayer graphene refers to graphene which consists of only a single layer of graphene. In the case of pristine graphene, for example, this layer this would be a single layer of carbon atoms. In the case of functionalized graphene, for example, this layer would be a single layer of carbon atoms with the various functional groups attached to the surface or the edge of said layer of carbon atoms. In alternative embodiments, the graphene is bilayer graphene. Bilayer graphene refers to graphene which consists of two layers as described above. In bilayer graphene the two layers may be stacked such that the carbon atoms in one layer are directly above the carbon atoms in the other layer or such that the carbon atoms in one layer are not directly above the carbon atoms in the other layer. In other alternative embodiments, the graphene is few-layer graphene. Few-layer graphene consists of two to five layers as described above. Bilayer graphene may be considered a type of few-layer graphene. In few-layer graphene, the layers of carbon atoms may be stacked as described above. The relative arrangement of the layers in bilayer and few-layer graphene, including both the positional and angular offset, can affect the chemical, mechanical, and electrical properties of the graphene.

In some embodiments, the graphene is present as graphene particles. The graphene particles may have a spherical shape, or may be shaped like blocks, flakes, ribbons, discs, granules, sheets, angular chunks, rectangular prisms, nanoplatelets, nanosheets, or some other shape. Graphene nanoplatelets may consist of stacks of graphene sheets, both the stacks and nanoplatelets each having an average thickness and an average diameter. Graphene flakes may be distinguished from graphene nanoplatelets by the thickness. Graphene nanoplatelets have a thickness of 1.75 to 100 nm preferably 2.25 to 90 nm, preferably 3.185 to 75 nm, preferably 3.675 to 70 nm, preferably 4.15 to 65 nm, preferably 4.75 to 60 nm, while graphene flakes have a thickness of 0.33 to 1.70 nm, preferably 0.50 to 1.50 nm, preferably 0.75 to 1.30 nm, preferably 0.81 to 1.285 nm, preferably 0.95 to 1.145 nm. The thickness of a graphene flake may not be uniform across the graphene flake. A graphene nanosheet may be distinguished from graphene flakes and graphene nanoplatelets in that graphene nanosheets consist of only a single layer of graphene, while flakes and nanoplatelets may contain more than one layer of graphene stacked on top of each other. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles are in the form of flakes, ribbons, discs, or sheets having a mean size in a range as previously described and having a largest dimension that is 50 to 500%, preferably 75 to 400, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the graphene particles may be in the form of agglomerates. The primary particles may be the graphene particles having a mean size as previously described. In some embodiments, the graphene particles are monodisperse, having a coefficient of variation or relative standard deviation, expressed as a percentage and defined as the ratio of the graphene particle size standard deviation ($\sigma$) to the graphene particle size mean ($\mu$), multiplied by 100%, of less than 25%, preferably less than 10%, preferably less than 8%, preferably less than 6%, preferably less than 5%. In a preferred embodiment, the graphene particles are monodisperse, having a graphene particle size distribution ranging from 80% of the average particle size to 120% of the average particle size, preferably 85 to 115%, preferably 90 to 110% of the average particle size. In another embodiment, the graphene particles are not monodisperse.

In some embodiments, the graphene is present in the catalytic nanoparticles in an amount of 0.25 to 10 wt %, preferably 0.3 to 9.5 wt %, preferably 0.4 to 9 wt %, preferably 0.5 to 8.5 wt %, preferably 0.6 to 8 wt %, preferably 0.7 to 7.5 wt %, preferably 0.75 to 7 wt %, preferably 0.8 to 6.5 wt %, preferably 0.85 to 6 wt %, preferably 0.9 to 5.75 wt %, preferably 0.95 to 5.5 wt %, preferably 1.0 to 5 wt %, preferably 1.25 to 3 wt %, preferably 1.5 to 2.5 wt %, preferably 1.75 to 2.25 wt %, preferably 1.9 to 2.1 wt % based on a total weight of the catalytic nanoparticles.

In some embodiments, the catalytic nanoparticles comprise separate particles of graphene and tungsten oxide. In such embodiments, the particles of graphene may have a particle size as described above. In such embodiments, the particles of tungsten oxide may have a particle size of 0.5 to 149 nm, preferably 1 to 125 nm, preferably 2.5 to 120 nm, preferably 5 to 115 nm, preferably 9 to 100 nm. In some embodiments, the particles of tungsten oxide are single crystalline. In such embodiments, the singe crystalline particles of tungsten oxide may have a particle size equal to the crystallite size as described above. In alternative embodiments, the particles of tungsten oxide are polycrystalline. In such embodiments, the polycrystalline particles of tungsten oxide may have a crystallite size as described above and a particle size as described above.

In some embodiments, the graphene is disposed upon a surface of the tungsten oxide particles. In some embodiments, the tungsten oxide particles are single crystalline. In such embodiments, the single crystalline tungsten oxide particles may have crystallite sizes and/or particle sizes as described above. In alternative embodiments, the tungsten oxide particles are polycrystalline. In such embodiments, the polycrystalline tungsten oxide particles may have crystallite sizes and/or particle sizes as described above.

In some embodiments, the graphene is incorporated into an interior of the tungsten oxide particles. In such embodiments, the tungsten oxide may be polycrystalline. In such embodiments, the polycrystalline tungsten oxide particles may have crystallite sizes and/or particle sizes as described above.

In embodiments where graphene is incorporated into an interior or disposed upon the surface of tungsten oxide particles, the catalytic nanoparticles may be considered to be a single type of particle with a heterogeneous composition.

In some embodiments, the transition metal boride is a metal-rich boride. Metal-rich borides are materials that consist essentially of metal cations and boride anions, which may have other atoms which act as dopants which are neutral, cationic, or anionic, and have a boron-to-metal atomic ratio of less than 4:1. Metal-rich borides are distinct from boron-rich borides, which are materials as described above having a boron-to-metal atomic ratio of or greater than 4:1. In some embodiments, the transition metal boride is a metal-rich boride. In some embodiments, the transition metal boride has a formula of $M_3B$, where M is a transition metal. In the above formula and the discussion below, it is understood that M may be a single transition metal, or a mixture of transition metals such that the total stoichiometry of the material satisfies the formula, e.g. $M_{3-x}M'_xB$, where $0 \leq x \leq 3$. Examples of transition metal borides having a formula of $M_3B$ include, but are not limited to $Re_3B$, $Ni_3B$, $Co_3B$, $Fe_3B$, $Cr_3B$, $Pt_3B$, and $V_3B$. Typically, transition metal borides having a formula of $M_3B$ contain discrete units of $B_2$ or $B_3$ within the material. Such a structure is distinguished from the structures of other metal-rich boride materials which may contain chains of boron atoms, sheets of boron atoms, or isolated boron atoms. Metal-rich boride materials having chains of boron atoms typically have a formula of MB, where M is a transition metal. Examples of such materials include, but are not limited to, FeB, TaB, and NiB. Metal-rich boride materials having sheets of boron atoms typically have a formula of $MB_2$. Examples of such materials include, but are not limited to, $CrB_2$, $TiB_2$, $ZrB_2$, $HfB_2$, $TaB_2$ and $UB_2$. Metal-rich boride materials having isolated boron atoms typically have a formula of $M_4B$. Examples of such materials include, but are not limited to $Mn_4B$ and $Cr_4B$.

In some embodiments, the transition metal boride is crystalline. In alternative embodiments, the transition metal boride is not crystalline.

In preferred embodiments, the transition metal boride is nickel boride. In preferred embodiments, the transition metal boride is nickel boride having a formula of $Ni_3B$.

In some embodiments, the transition metal boride is present as particles. In some embodiments, the transition metal boride particles have a mean particle size of 0.25 to 149 nm, preferably 1 to 125 nm, preferably 2.5 to 120 nm, preferably 5 to 115 nm, preferably 9 to 100 nm. In some embodiments, the transition metal boride particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the transition metal boride particles may be substantially spherical, meaning that the distance from the particle centroid (center of mass) to anywhere on the particle outer surface varies by less than 30%, preferably by less than 20%, more preferably by less than 10% of the average distance. In some embodiments, the transition metal boride particles are in the form of blocks, granules, terraced rectangular prisms, or angular chunks, having a mean size in a range as previously described and having a largest dimension that is 50 to 500%, preferably 75 to 400%, preferably 100 to 350%, preferably 150 to 250% of the range previously described and a smallest dimension that is 5 to 150%, preferably 10 to 125%, preferably 15 to 100%, preferably 25 to 75% of the range previously described. In some embodiments, the transition metal boride particles may be in the form of agglomerates. The primary particles may be the transition metal boride particles having a mean size as previously described. In some embodiments, the transition metal boride particles are monodisperse, having a coefficient of variation or relative standard deviation, expressed as a percentage and defined as the ratio of the particle size standard deviation ($\sigma$) to the particle size mean ($\mu$), multiplied by 100%, of less than 25%, preferably less than 10%, preferably less than 8%, preferably less than 6%, preferably less than 5%. In a preferred embodiment, the transition metal boride particles are monodisperse, having a particle size distribution ranging from 80% of the mean particle size to 120% of the average particle size, preferably 85 to 115%, preferably 90 to 110% of the mean particle size. In another embodiment, the transition metal boride particles are not monodisperse.

In some embodiments, the transition metal hydroxide has a formula $M'(OH)_2$ where M' is a transition metal. In general, such a formula is only satisfied by a divalent transition metal cation. In the above formula and the discussion below, it is understood that M' may be a single transition metal, or a mixture of transition metals such that the total stoichiometry of the material satisfies the formula, e.g. $M'_{1-x}M''_x(OH)_2$, where $0 \leq x \leq 1$. In some embodiments, the transition metal or metals present in the transition metal hydroxide may be different from the transition metal or metals present in the transition metal boride. In alternative embodiments, the transition metal or metals present in the transition metal hydroxide may be the same as the transition metal or metals present in the transition metal boride.

In some embodiments, the transition metal hydroxide is crystalline. In alternative embodiments, the transition metal hydroxide is not crystalline.

In preferred embodiments, the transition metal hydroxide is nickel hydroxide having a formula of $Ni(OH)_2$.

In some embodiments, the transition metal hydroxide is present as particles. In some embodiments, the transition metal hydroxide particles have a mean particle size of 0.5 to 149 nm, preferably 1 to 125 nm, preferably 2.5 to 120 nm, preferably 5 to 115 nm, preferably 9 to 100 nm. In some embodiments, the transition metal hydroxide particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the transition metal hydroxide particles may be substantially spherical, meaning that the distance from the particle centroid (center of mass) to anywhere on the particle outer surface varies by less than 30%, preferably by less than 20%, more preferably by less than 10% of the average distance. In some embodiments, the transition metal hydroxide particles are in the form of blocks, granules, terraced rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150%, preferably 10 to 125%, preferably 15 to 100%, preferably 25 to 75% of the range previously described. In some embodiments, the transition metal hydroxide particles may be in the form of agglomerates. The primary particles may be the transition metal hydroxide particles having a mean size as previously described. In some embodiments, the transition metal hydroxide particles are monodisperse, having a coefficient of variation or relative standard deviation, expressed as a percentage and defined as the ratio of the particle size standard deviation ($\sigma$) to the particle size mean ($\mu$), multiplied by 100%, of less than 25%, preferably less than 10%, preferably less than 8%, preferably less than 6%, preferably less than 5%. In a preferred embodiment, the transition metal hydroxide particles are monodisperse, having a particle size distribution ranging from 80% of the mean particle size to 120% of the average particle size, preferably 85 to 115%, preferably 90 to 110% of the mean particle size. In another embodiment, the transition metal hydroxide particles are not monodisperse.

In some embodiments, the co-catalytic nanoparticles comprise separate particles of transition metal boride and transition metal hydroxide. In such embodiments, the particles of transition metal boride have a particle size as described above. In such embodiments, the particles of transition metal boride have a particle size of 0.5 to 149 nm, preferably 1 to 125 nm, preferably 2.5 to 120 nm, preferably 5 to 115 nm, preferably 9 to 100 nm. In some embodiments, the particles of transition metal boride are crystalline. In some embodiments, the particles of transition metal boride are single crystalline. In alternative embodiments, the particles of transition metal boride are polycrystalline. In other alternative embodiments, the particles of transition metal boride are not crystalline. In some embodiments, the particles of transition metal hydroxide have a particle size as described above. In such embodiments, the particles of transition metal hydroxide have a particle size of 0.5 to 149 nm, preferably 1 to 125 nm, preferably 2.5 to 120 nm, preferably 5 to 115 nm, preferably 9 to 100 nm. In some embodiments, the particles of transition metal hydroxide are crystalline. In some embodiments, the particles of transition metal hydroxide are single crystalline. In alternative embodiments, the particles of transition metal hydroxide are polycrystalline. In other alternative embodiments, the particles of transition metal hydroxide are not crystalline.

In some embodiments, the transition metal hydroxide is disposed upon a surface of the transition metal boride particles. In alternative embodiments, the transition metal boride may be disposed upon a surface of the transition metal hydroxide particles. In some embodiments, the transition metal boride may be incorporated into an interior of the transition metal hydroxide particles. In embodiments where the transition metal boride is incorporated into an interior of the transition metal hydroxide or in embodiments where the transition metal hydroxide is disposed upon a surface of the transition metal boride, the co-catalytic nanoparticles may be considered to be a single type of particle with a heterogeneous composition.

In some embodiments, the co-catalytic nanoparticles are present in an amount of 0.25 to 10 wt %, preferably 0.5 to 7.5 wt %, preferably 0.75 to 5 wt %, preferably 1 to 2.5 wt %, based on a total weight of composite photocatalyst. In some embodiments, the co-catalytic nanoparticles and catalytic nanoparticles exist as separate nanoparticulate components. In some embodiments, the co-catalytic nanoparticles and catalytic nanoparticles exist as agglomerates. In such embodiments, the agglomerates comprise both catalytic nanoparticles and co-catalytic nanoparticles. In some embodiments, the co-catalytic nanoparticles are disposed upon a surface of the catalytic nanoparticles.

In some embodiments, the composite photocatalyst is in the form of particles having a mean particle size of 5 to 150 nm, preferably 6 to 125 nm, preferably 7 to 115 nm, preferably 9 to 100 nm. In preferred embodiments, the particle size is determined by electron microscopy. In some embodiments, the composite photocatalyst has a surface area of 75 to 150 m²/g, 77.5 to 145 m²/g, preferably 80 to 140 m²/g, preferably 82.5 to 135 m²/g, preferably 85 to 132 m²/g. In preferred embodiments, the surface area is a BET surface area. In some embodiments, the composite photocatalyst is porous. In some embodiments, the composite photocatalyst has a mean pore volume of 0.05 to 0.15 cm³g⁻¹, preferably 0.06 to 0.14 cm³g⁻¹, preferably 0.07 to 0.13 cm³g⁻¹, preferably 0.08 to 0.12 cm³g⁻¹, preferably 0.09 to 0.11 cm³g⁻¹. In some embodiments, the composite photocatalyst has a mean pore size of 5 to 20 nm, preferably 6 to 18 nm, preferably 7 to 16 nm, preferably 8 to 14 nm, preferably 9 to 12 nm, preferably 10 to 11.5 nm, preferably 10.5 to 11 nm. The pore volume and pore size may be determined by any suitable technique known to one of ordinary skill in the art. Examples of such techniques include, but are not limited to, gas adsorption-desorption and mercury intrusion porosimetry.

In some embodiments, the composite photocatalyst has a band gap of 2.25 to 2.60 eV, preferably 2.30 to 2.55 eV, preferably 2.35 to 2.50 eV, preferably 2.40 to 2.45 eV.

The present disclosure also relates to a method of prepared the composite photocatalyst described above. The method involves first dispersing catalytic particles comprising tungsten oxide and graphene in a first precursor solution comprising a first transition metal halide. In some embodiments, the first transition metal halide is a metal chloride. In some embodiments, the first transition metal halide is nickel (II) chloride. The present disclosure is intended to include all hydration states of a given compound or formula, unless otherwise noted or when heating a material. For example, nickel (II) chloride includes anhydrous $NiCl_2$ and $NiCl_2.6H_2O$, and any other hydrated forms or mixtures. In some embodiments, the graphene is present in the catalytic particles in an amount of 0.25 to 10 wt %, preferably 0.3 to 9.5 wt %, preferably 0.4 to 9 wt %, preferably 0.5 to 8.5 wt %, preferably 0.6 to 8 wt %, preferably 0.7 to 7.5 wt %, preferably 0.75 to 7 wt %, preferably 0.8 to 6.5 wt %, preferably 0.85 to 6 wt %, preferably 0.9 to 5.75 wt %, preferably 0.95 to 5.5 wt %, preferably 1.0 to 5 wt %, preferably 1.25 to 3 wt %, preferably 1.5 to 2.5 wt %, preferably 1.75 to 2.25 wt %, preferably 1.9 to 2.1 wt % based on a total weight of the catalytic nanoparticles. In some embodiments, the catalytic particles are as described above. In some embodiments, the solvent of the first precursor solution is water. In some embodiments, the solvent of the first precursor solution is a polar organic solvent. Examples of polar organic solvents include, but are not limited to, methanol, ethanol, n-propanol, isopropanol, formic acid, acetic acid, nitromethane, acetonitrile, propylene carbonate, dimethylsulfoxide, dimethylformamide, ethyl acetate, acetone, tetrahydrofuran, 1,4-dioxane, and dichloromethane. In some embodiments, the polar organic solvent is an anhydrous polar organic solvent. In some embodiments, the solvent of the first precursor solution is a mixture of one or more polar organic solvents. In some embodiments, the solvent of the first precursor solution is a mixture of water and a polar organic solvent miscible with water. In some embodiments, said mixture comprises about 1 to 99% v/v water, preferably 2 to 98% v/v water, preferably 5 to 95% v/v water, preferably 10 to 90% v/v water, preferably 15 to 85% v/v water. Examples of polar organic solvents miscible with water include, but are not limited to methanol, ethanol, isopropanol, acetic acid, acetonitrile, acetone, dimethylformamide, dimethylsulfoxide, 1,4-dioxane, and tetrahydrofuran.

In some embodiments, the catalytic nanoparticles are prepared by solvothermal treatment of a catalytic nanoparticle synthesis solution comprising particles of $WO_3$ and particles of graphene. In some embodiments, the particles of $WO_3$ are as described above. In some embodiments, the particles of graphene are as described above. In some embodiments, the solvent of the catalytic nanoparticle synthesis solution is a polar organic solvent. In some embodiments, the polar organic solvent is an anhydrous polar organic solvent. In some embodiments, the solvent of the first precursor solution is a mixture of one or more polar organic solvents. In some embodiments, the solvent of the first precursor solution is a mixture of water and a polar organic solvent miscible with water. In some embodiments, said mixture comprises about 1 to 99% v/v water, preferably 2 to 98% v/v water, preferably 5 to 95% v/v water, preferably 10 to 90% v/v water, preferably 15 to 85% v/v water. In some embodiments, the solvent of the catalytic nanoparticle synthesis solution is ethanol. In some embodiments, the solvothermal treatment takes place at 150 to 250° C., preferably 160 to 240° C., preferably 170 to 230° C., preferably 180 to 220° C., preferably 190 to 210° C., preferably 195 to 205° C., preferably 200° C. for 1 to 24 hours, preferably 2 to 22 hours, preferably 4 to 20 hours, preferably 6 to 18 hours, preferably 8 to 16 hours, preferably 10 to 14 hours, preferably 11 to 13 hours, preferably 12 hours. In some embodiments, following the solvothermal treatment, the catalytic nanoparticles are collected by a technique suitable for separation of a nanoscopic solid from a liquid known to one of ordinary skill in the art. Examples of such techniques include, but are not limited to, centrifugation, filtration, and decantation, but excluding techniques such as evaporation. In some embodiments, the catalytic nanoparticles are washed with a wash solvent prior to use in the method of the current invention. In some embodiments, the wash solvent is a polar organic solvent as described above. In some embodiments, the wash solvent is water. In some embodiments, the catalytic nanoparticles are washed a single time. In alternative embodiments, the catalytic nanoparticles are washed more than one time. In such embodiments, the washes may be performed with the same solvent or a different solvent. In some embodiments, the catalytic nanoparticles are washed with ethanol. In some embodiments, the catalytic nanoparticles are washed with water. In preferred embodiments, the catalytic nanoparticles are washed at least one time with ethanol and at least one time with water. In some embodiments, the catalytic nanoparticles are dried prior to use in the method of the current invention. In some embodiments, the drying is performed at ambient temperature. In alternative embodiments, the drying is performed at 30 to 120° C., preferably 40 to 110° C., preferably 50 to 100° C., preferably 60 to 95° C., preferably 70 to 90° C., preferably 75 to 85° C., preferably 80° C. In some embodiments, the drying is performed for 1 to 48 hours, preferably 2 to 46 hours, preferably 4 to 44 hours, preferably 6 to 42 hours, preferably 8 to 40 hours, preferably 10 to 38 hours, preferably 12 to 36 hours, preferably 14 to 34 hours, preferably 16 to 32 hours, preferably 18 to 30 hours, preferably 20 to 28 hours, preferably 22 to 26 hours, preferably 23 to 25 hours, preferably 24 hours.

The method next involves adding a reducing agent solution comprising a borohydride reducing agent and a hydroxide base to the first precursor solution and stirring to form a boride-containing product. In some embodiments, the borohydride reducing agent is an alkali metal borohydride. Examples of alkali metal borohydrides include, but are not limited to, sodium borohydride, sodium cyanoborohydride, sodium trimethylborohydride, lithium triethylborohydride, and lithium tri-sec-butylborohydride. In preferred embodiments, the borohydride reducing agent is sodium borohydride. In some embodiments, the hydroxide base is an alkali metal hydroxide base. In some embodiments, the alkali metal of the alkali metal hydroxide base is the same as the alkali metal of the alkali metal borohydride. In some embodiments, the alkali metal hydroxide base is sodium hydroxide. In some embodiments, In some embodiments, the solvent of the reducing agent solution is a polar organic solvent as described above. In some alternative embodiments, the solvent of the reducing agent solution is water.

The method next involves dispersing the boride-containing product in a second precursor solution comprising a second transition metal halide, a hypophosphite salt, and an aminoalcohol to form a photoreaction mixture. In some embodiments, the second transition metal halide is the same as the first transition metal halide. In some embodiments, the second transition metal halide has the same metal cation but a different halide anion as the first transition metal halide. In some embodiments, the second transition metal halide has the same halide anion but a different metal cation as the first transition metal halide. In preferred embodiments, the second transition metal halide is nickel (II) chloride. In some embodiments, the hypophosphite salt is an alkali metal hypophosphite salt. In some embodiments, the alkali metal of the alkali metal hypophosphite salt is the same as the alkali metal of the alkali metal borohydride, the alkali metal hydroxide base, or both. In some embodiments, the alkali metal hypophosphite salt is sodium hypophosphite. In some embodiments, the aminoalcohol has a ratio of alcohol functional groups to amine functional groups of 1.5:1 to 5:1, preferably 2:1 to 4:1, preferably 2.5:1 to 3.5:1, preferably 3:1. In some embodiments, the aminoalcohol has at least one tertiary amine functional group. In some embodiments, the aminoalcohol is devoid of primary or secondary amine functional groups. In some embodiments, the aminoalcohol is triethanolamine. In some embodiments, the solvent of the second precursor solution is a polar organic solvent as described above. In some alternative embodiments, the solvent of the second precursor solution is water.

The method next involves irradiating the photoreaction mixture with UV and visible light for 5 to 60 minutes to form the composite photocatalyst. In general, the irradiating can be performed with any light source known to one of ordinary skill in the art. In some embodiments, the source of the mixture of UV and visible light is the sun. In some embodiments, the source of the mixture of UV and visible light is an artificial light source. Examples of artificial light sources include, but are not limited to an incandescent lamp, an argon flash lamp, a carbide lamp, gas lighting, a kerosene lamp, an oil lamp, an arc lamp, a flashtube, a gas discharge lamp, an electrodeless lamp, an excimer lamp, a fluorescent lamp, a carbon arc lamp, a ceramic discharge metal-halide lamp, a mercury-vapor lamp, a sodium-vapor lamp, a xenon arc lamp, a neon lamp, a plasma lamp, an LED, a light-emitting electrochemical cell, an electroluminescent material, a laser including, but not limited to chemical, dye, free-electron, gas, ion, diode, metal-vapor, quantum well, ruby, and solid-state type lasers, and a deuterium arc lamp. In some embodiments, a single type of light source is used. In alternative embodiments, more than one type of light source is used. In some embodiments, the irradiating is performed with a xenon lamp. In some embodiments, the xenon lamp is operated at 250 to 350 W, preferably 260 to 340 W, preferably 270 to 330 W, preferably 280 to 320 W, preferably 290 to 310 W, preferably 300 W. In some embodiments, the irradiating is performed for 5 to 60 minutes, preferably 10 to 50 minutes, preferably 15 to 45 minutes, preferably 20 to 40 minutes, preferably 25 to 35 minutes, preferably 27.5 to 32.5 minutes, preferably 29 to 31 minutes, preferably 30 minutes.

The method last involves collecting the composite photocatalyst. In some embodiments, the composite photocatalyst is collected by a technique suitable for separation of a nanoscopic solid from a liquid known to one of ordinary skill in the art as described above. In some embodiments, the composite photocatalyst is washed with a wash solvent as described above. In some embodiments, the composite photocatalyst is washed a single time. In alternative embodiments, the composite photocatalyst is washed more than one time. In such embodiments, the washes may be performed with the same solvent or a different solvent. In some embodiments, the composite photocatalyst is washed with ethanol. In some embodiments, the composite photocatalyst is washed with water. In some embodiments, the composite photocatalyst is dried following the collection or the washing as described above.

The present disclosure also relates to a method of degrading an organic pollutant, the method comprising contacting a solution comprising the organic pollutant with the composite photocatalyst to form a catalytic mixture; and irradiating the catalytic mixture with visible light for 1 to 180 minutes. In some embodiments, the irradiating is performed using a light source known to one of ordinary skill in the art as described above. In some embodiments, the irradiating is performed with the sun. In some embodiments, the irradiating is performed using a metal-halide lamp. In some embodiments, the metal halide lamp is operated at 200 to 600 W, preferably 250 to 550 W, preferably 300 to 500 W, preferably 325 to 475 W, preferably 350 to 450 W, preferably 375 to 425 W, preferably 390 to 410 W, preferably 400 W. In some embodiments, the composite photocatalyst is present in the catalytic mixture in an amount of 0.05 to 0.5 mg/mL, preferably 0.075 to 0.45 mg/mL, preferably 0.1 to 0.4 mg/mL, preferably 0.125 to 0.35 mg/mL, preferably 0.15 to 0.30 mg/mL, preferably 0.175 to 0.25 mg/mL, preferably 0.19 to 0.225 mg/mL, preferably 0.2 mg/mL.

In some embodiments, the organic pollutants may be a dye, a phenol, a polycyclic aromatic hydrocarbon, an herbicide, a pesticide, a persistent organic pollutant, or the like.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a] pyrene, corannulene, benzo[g,h,i]perylene, coronene, ovalene, benzo[c]fluorine, acenaphthene, acenaphthylene, benz [a]anthracene, benzo[b]fluoranthene, benzo[j]fluoranthene, benzo[k]fluoranthene, benzo[e]pyrene, cyclopenta[c,d] pyrene, dibenz[a,h]anthracene, dibenzo[a,e]pyrene, dibenzo [a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

In some embodiments, the organic pollutant is at least one selected from the group consisting of chloramphenicol, tetracycline, methotrexate, methylene orange, methylene blue, crystal violet, and Rhodamine-B.

In some embodiments, the solvent of the solution comprising the organic pollutant is water. In some embodiments, the solvent of the solution comprising the organic pollutant is a polar organic solvent as described above.

In some embodiments, the irradiating is performed for 1 to 180 minutes, preferably 5 to 175 minutes, preferably 10 to 170 minutes, preferably 15 to 165 minutes, preferably 20 to 160 minutes preferably 25 to 155 minutes, preferably 30 to 150 minutes, preferably 35 to 145 minutes, preferably 40 to 140 minutes, preferably 45 to 135 minutes, preferably 50 to 130 minutes, preferably 55 to 125 minutes, preferably 60 to 120 minutes, preferably 65 to 115 minutes, preferably 70 to 110 minutes, preferably 75 to 105 minutes.

In some embodiments, organic pollutant is methylene blue, and the method degrades greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99%, preferably greater than 99.5%, preferably greater than 99.9% of an initial amount of methylene blue after irradiating for 75 to 105 minutes, preferably 80 to 100 minutes, preferably 85 to 95 minutes, preferably 87.5 to 92.5 minutes, preferably 89 to 91 minutes, preferably 90 minutes.

The present disclosure also relates to a method of producing hydrogen gas comprising exposing a mixture comprising the composite photocatalyst and water to visible light, and collecting hydrogen gas. In some embodiments, the mixture further comprises sodium sulfide ($Na_2S$). In some embodiments, the sodium sulfide is present in an amount of 0.01 to 0.5 mol/L, preferably 0.05 to 0.25 mol/L, preferably 0.075 to 0.15 mol/L, preferably 0.1 mol/L based on a total number of liters of mixture. In some embodiments, the mixture further comprises sodium sulfite ($Na_2SO_3$). In some embodiments, the sodium sulfite is present in an amount of 0.005 to 0.1 mol/L, preferably 0.01 to 0.09 mol/L, preferably 0.015 to 0.08 mol/L, preferably 0.02 to 0.06 mol/L, preferably 0.025 to 0.05 mol/L, preferably 0.03 to 0.045 mol/L, preferably 0.035 to 0.0425 mol/L, preferably 0.04 mol/L based on a total number of liters of mixture. In some embodiments, the exposing is performed with a light source known to one of ordinary skill in the art as described above. In some embodiments, the light source is the sun. In some embodiments, the light source is a metal-halide lamp. In some embodiments, the metal halide lamp is operated at 200 to 600 W, preferably 250 to 550 W, preferably 300 to 500 W, preferably 325 to 475 W, preferably 350 to 450 W, preferably 375 to 425 W, preferably 390 to 410 W, preferably 400 W. In some embodiments, the mixture is mixed before exposing. In some embodiments, the mixing is performed with agitation such as stirring, shaking, rocking, sonication, ultrasonication, bubbling, or another technique known to one of ordinary skill in the art. In some embodiments, the stirring may be done by a mechanical stirrer, a stirring rod, a magnetic stirrer, an impeller, or the like. In some embodiments, the exposing is performed under an inert atmosphere. In some embodiments, the mixing is performed under inert atmosphere. In some embodiments, the inert atmosphere is provided with nitrogen gas.

In some embodiments, the method produces hydrogen gas at a rate of 250 to 750 mmol $H_2$ per hour per gram of composite photocatalyst, preferably 300 to 725 mmol $H_2$, preferably 350 to 700 mmol $H_2$, preferably 375 to 675 mmol $H_2$, preferably 400 to 650 mmol $H_2$, preferably 450 to 625 mmol $H_2$, preferably 500 to 600 mmol $H_2$, preferably 525 to 590 mmol $H_2$, preferably 550 to 575 mmol $H_2$ per hour per gram of composite photocatalyst.

The examples below are intended to further illustrate protocols for and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Example 1

Preparation and Synthesis of Materials, $WO_3$, and Composite Nanostructures

Sodium-tungstate dihydrate, graphite, NaCl, $H_2SO_4$, $KMnO_4$, $H_3PO_4$, nickel (II) chloride hexahydrate, $NaBH_4$, NaOH, distilled water, HCl, ethanol, and model dyes were purchased and utilized with no additional purification. Facile hydrothermal treatment was carried out to prepare $WO_3$ nanoparticles by using $Na_2WO_4.2H_2O$, and NaCl as reported by authors' previous work [Tahir, M. B., et. al., Journal of Inorganic and Organometallic Polymeric Materials, 2018, 28, 738, doi:10.1007/s10904-017-0720-8, incorporated herein by reference in its entirety]. Graphene nanoparticles were produced from graphite by Hummer's treatment. With constant stirring, 0.225 g graphite was added to a mixture in 9:3 proportions of $H_2SO_4$ and $H_3PO_4$. Then 1.32 g of $KMnO_4$ was added to the above mixture and stirred for 5 h until it became dark green. Afterward, deionized water and 10 ml of HCl was added. The prepared mixture was centrifuged for 7 minutes at 5000 RPM. The precipitates were washed using ethanol and deionized water to avoid acidic and basic contents and impurities. The suspension was dried at 90° C. for 24 h. The prepared sample of $WO_3$ (50 mg) along with 40 mL ethanol was taken in a glass beaker, and the specific amount of graphene (2%) was added. This suspension was ultra-sonicated for 90 min and then placed in a stainless steel 100 ml autoclave and after in a furnace for 12 h at 200° C. Prepared particles were washed with ethanol and deionized water and finally dehydrated in a furnace at 80° C. for 24 h. The $Ni_3B$ was prepared from $Ni^{2+}$ by using $NaBH_4$ as a robust reducing agent (ice-water bath) using a facile chemical reduction technique. Afterward, photo accumulation of $Ni(OH)_2$ was executed according [Shahzad K., et. al., International Journal of Hydrogen Energy, 2019, 44, 39, 21738-21745, incorporated herein by reference in its entirety]. The noble-metal-free $Ni_3B/Ni(OH)_2$ improved $WO_3$/graphene was effectively produced as a photocatalyst, and its role as co-catalyst in enhancing the performance of photocatalyst was examined. The pure $WO_3$, $WO_3$/graphene, 1%, 1.5%, 2.0%, 2.5% of $Ni_3B/Ni(OH)_2$ in $WO_3$/graphene were named as W, WG-1, WG-2, WG-3, WG-4, WG-5, respectively.

Example 2

Characterizations

SEM (SEM, HITACHI-S4800, USA) at working conditions of energy: 30 KV, magnification 300,000×, and settling power 2.3 nm was employed to examine the morphology of the as-synthesized material. X-rays diffractometer (XRD—X'pert PRO-MPD, Netherlands) with wavelength 1.5418 Å was used to examine the basic highlights of arranged material at working conditions of 20-40 kV and 2.5-30 mA. Brunauer-Emmett-Teller (BET—NOVA2200e-Quantachrome, USA) was utilized for the assurance of pore appropriation and volume, and the particular surface region. Energy Dispersive X-rays (EDX—JSM5910, INCA200 Oxford, UK) coupled with SEM was utilized for the affirmation of the immaculateness and basic structure of the created nanostructures. XRS (ESCALAB 250, XPS System) with Al Kα, hv=1486.6 eV was used to consider the synthetic and electronic conditions of the current organization of the readied tests. UV-vis Spectroscopy (VARIAN, Cary 5000, USA) was employed to characterize the absorbance of prepared samples with a solution of $BaSO_4$. The intensity of as-synthesized material corresponding to the wavelength of light at room temperature was measured using photoluminescence spectrophotometer (HITACHI F-4500, USA) based on the photoluminescence emission spectroscopy technique.

Example 3

Dyes Degradation and H$_2$ Generation

Photocatalytic performance of composite nanostructures prepared with varying concentration of Ni$_3$B/Ni(OH)$_2$ in composite was measured by degrading different dyes including C, TC, MT, MO, MB, CV, and RhB under visible light source metal halide lamp having power of 400 W. All 6 samples, WO$_3$, WG-1, WG-2, WG-3, WG-4, and WG-5, of 20 mg were inserted into dyes solution (100 ml) separately for every sample material at optimum value. The arrangement was put in the dark with consistent mixing for half an hour. Afterward, the prepared solution, in double wall beaker, was positioned inside the indigenous photocatalytic reactor for the irradiation through metal halide. After a particular interval of time (30 min, 60 min, and 90 min), the 5 ml solution was removed to determine the absorption spectra for % degradation. The solution was centrifuged at 2000 rpm for 7 min to remove the residues before the characterization. The effectiveness of photocatalytic degradation was calculated by [(C−C$_o$/C$_o$)×100], where C$_o$ represents the initial absorption of dye after the equilibrium-adsorption, and C represents the concentration of the degraded sample.

The photocatalytic activity for green energy production as H$_2$ fuel was carried out inside a closed quartz reactor with the illumination by a metal halide lamp having a cut-off filter (λ≥400 nm). In each trial, 30 mg photocatalyst (W, WG-1, WG-2, WG-3, WG-4 and WG-5) was dissolved in 100 mL fluid arrangement including 0.1 M Na$_2$S and 0.04 M Na$_2$SO$_3$ within the photocatalytic reactor-framework. The entire blended arrangement, under nitrogen gas, was sonicated in an ultrasonic bath for 7 min.

Example 4

XRD and SEM Analysis

FIGS. 1A-1F showed the XRD shapes of prepared nanostructures for WO$_3$ and composite photocatalysts. The samples of synthesized nanostructures were named as 1% graphene-WO$_3$ (WG-1), 2% graphene-WO$_3$ (WG-2), 3% graphene-WO$_3$ (WG-3), 4% graphene-WO$_3$ (WG-4) and 5% graphene-WO$_3$ (WG-5). The XRD calculations were used to find the crystalline size and phase of nanostructures. For WO$_3$, the features peaks at 21.83°, 22.71°, 23.26°, 25.41°, 27.91°, 34.5°, 37.12°, 52.64°, 59.73° with hkl planes (002), (020), (200), (120), (112), (022), (410), and (402) respectively, represented the establishment of monoclinic and hexagonal phase. The given patterns were well matched with prepared pure WO$_3$ structure, indexed using reference cards including JCPDS-89-4476 and JCPDS-43-1035 to represent monoclinic and hexagonal phase respectively, indicating the best crystalline structure of nanomaterials. The comparison of composite samples showed that pure WO$_3$ and the composite had nearly same peaks location, but peak intensity of graphene incorporated WO$_3$ was slightly diminished, demonstrating lower crystallinity after incorporation of graphene. Further in WG-1 nanostructures, peaks were not found for graphene owing to numerous reasons including the low mass substance of graphene in WO$_3$ and/or relatively less diffraction, the intensity of graphene, shielding by WO$_3$ peaks and restacking of graphene-sheet [Chen H. H., et. al., Appl. Surf. Sci., 2016, 389, 491-495, incorporated herein by reference]. For sample WG-4, the peaks due to graphene layer-structure were found at an angle of 26.62°, and 54.67°. The crystalline size was determined by Debye-Scherer formula (Equation 1):

$$t = \frac{K\lambda}{\beta\cos\theta} \quad (1)$$

where K=0.89, λ=0.154 and t represents the average crystalline size, β is FWHM, and θ is known as Bragg angle. The calculated crystallite size of prepared nanostructures was 17, 14.4, 12.7, 11.8, 7.09 and 11.3 nm for pure WO$_3$, WG-1, WG-2, WG-3, WG-4, and WG-5, respectively. The decrease in the average crystalline size demonstrated the doping of graphene content in WO$_3$. The relatively small width of XRD peaks indicated that size of nano-crystal was less than 20 nm. Additionally, the reduction in dimension might be beneficial for transmission of electron/hole pairs to the catalyst's exterior, wherever it could show significant character to enhance photocatalytic activity by decreasing the recombination rate [Mu W., et. al., RSC Adv., 2014, 4, 68, 36064-36070, incorporated herein by reference in its entirety].

Figure 2A:
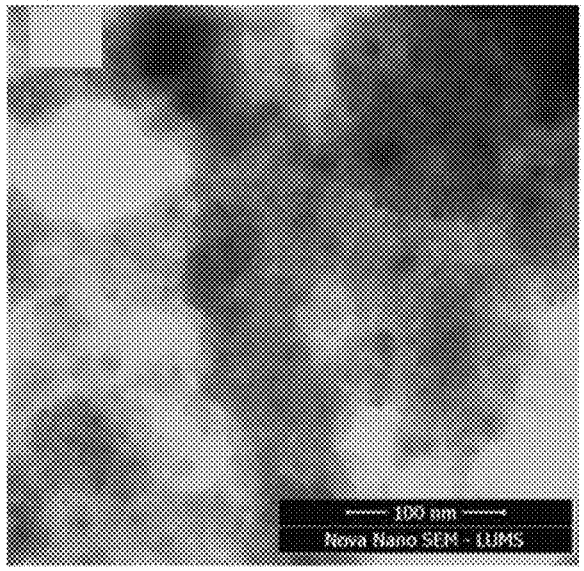
FIG. 2A-2D are SEM micrographs where
Figure 2B:
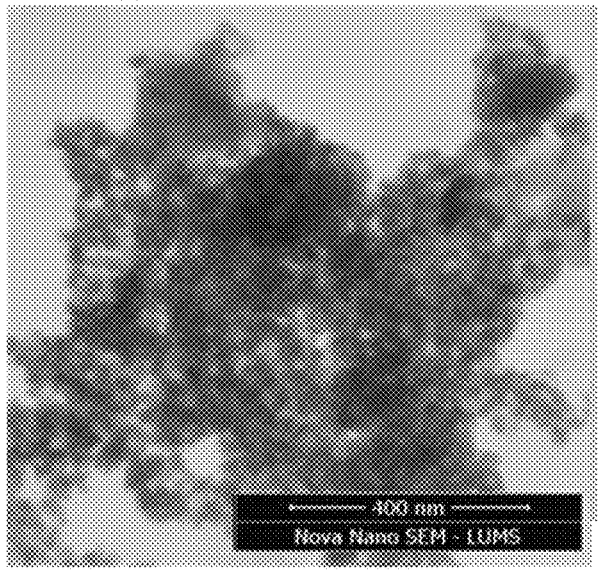
Figure 2C:
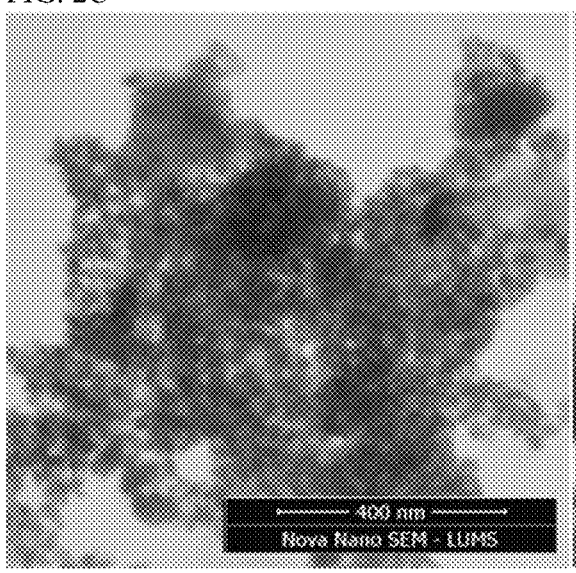
Figure 2D:
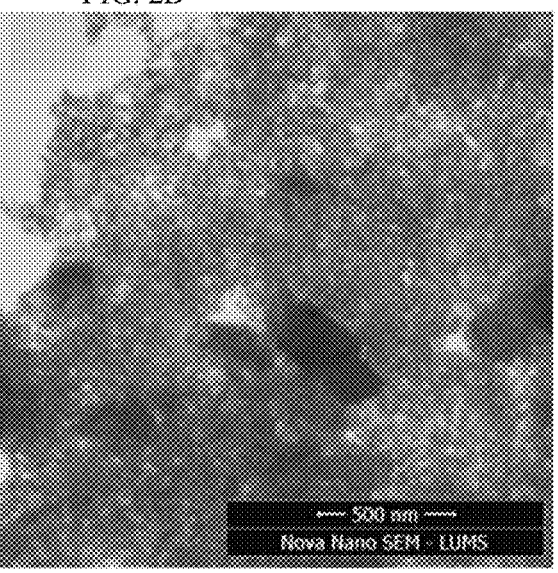

SEM was used to examine surface morphology of prepared nanostructures and obtained images for graphene (FIG. 2A), pure WO$_3$ (FIG. 2B), WG-4 (FIG. 2C) and WG-5 composite nanostructures (FIG. 2D). The micrographs for graphene and pure WO$_3$ were presumed to compare with composite nanostructures. The layered and stacking like morphology for graphene nanostructures and pure WO$_3$ spherical nanoparticles in the range of 8-115 nm were observed. For the determination of the growth mechanism of nanostructures, graphene-dependent tests were carried out, and morphology growth was accepted consequently. The morphology, shape, and size of prepared nanostructures greatly influenced the photocatalytic activity with harmful dyes [Mohagheghian A., et. al., J. Adv. Oxid. Technol., 2015, 18, 1, 61-68, incorporated herein by reference in its entirety]. It was observed that the WG-4 sample achieved the ideal status that affirmed the minimal particle dimensions with a normal size of 9 nm for a particle, though different examples demonstrated large size for particles estimates even stretched out to the sub-micrometer range.

Example 5

BET Surface Area and EDX Analysis

Figure 3:
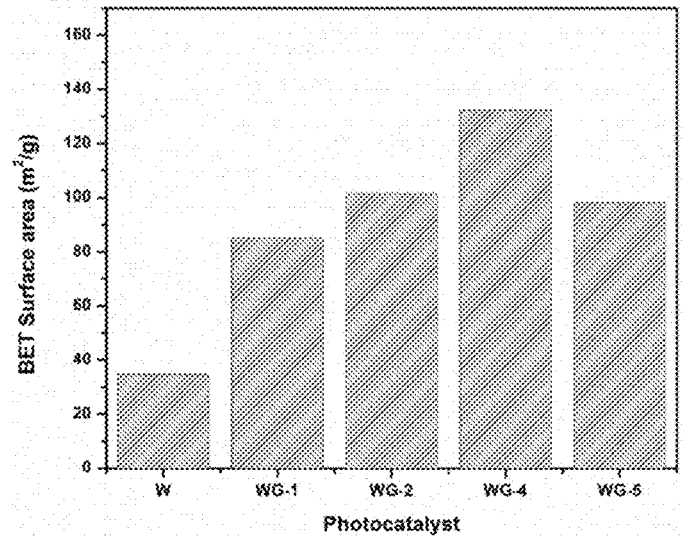
FIG. 3 is plot of the BET surface area for various graphene-$WO_3$—$Ni_3B/Ni(OH)_2$ composite photocatalysts.

FIG. 3 displays the BET surface area of pure WO$_3$ and graphene-WO$_3$ sample's surface area. The isotherms of nitrogen adsorption-desorption were used to calculate their surface areas. The measured surface area of prepared nanostructures of pure WO$_3$, WG-1, WG-2, WG-3, WG-4, and WG-5 was determined to be 34.726, 85.13, 101.54, 116.38, 132.31 and 98.16 m$^2$/g respectively. The BET calculation revealed that 4% graphene-WO$_3$ showed 3.88 times higher surface area of 132.31 m$^2$g$^{-1}$ than that of pure WO$_3$ (34.726 m$^2$g$^{-1}$). The growth in surface area accredited to the incorporation of graphene in WO$_3$ photocatalyst. The BJH scheme was utilized to decide the pore estimate via nitrogen isotherm using desorption line. The diameter of the average pore size was 10.9 nm for pure WO$_3$ and composite with mesoporous structures. The prepared samples with developed surface area and higher pore volume (0.094 cm$^3$g$^{-1}$) than pure WO$_3$ (0.032 cm$^3$g$^{-1}$) yielded great adsorption value for organic particles, which was very advantageous for wastewater purification [Mohagheghian A., et. al., J. Adv. Oxid. Technol., 2015, 18, 1, 61-68, incorporated herein by reference in its entirety]. It was observed from the SEM findings that the increase in surface area was not consistent with that of the size of the nanoparticles. Likewise, the adjustment in the surface area was turned into no restrictions. The higher surface area of composite nanostructures could give more active sites for photocatalytic response [Liew S. L., et. al., Int. J. Hydrog. Energy, 2014, 39, 9, 4291-4298, incorporated herein by reference in its entirety].

Figure 4:
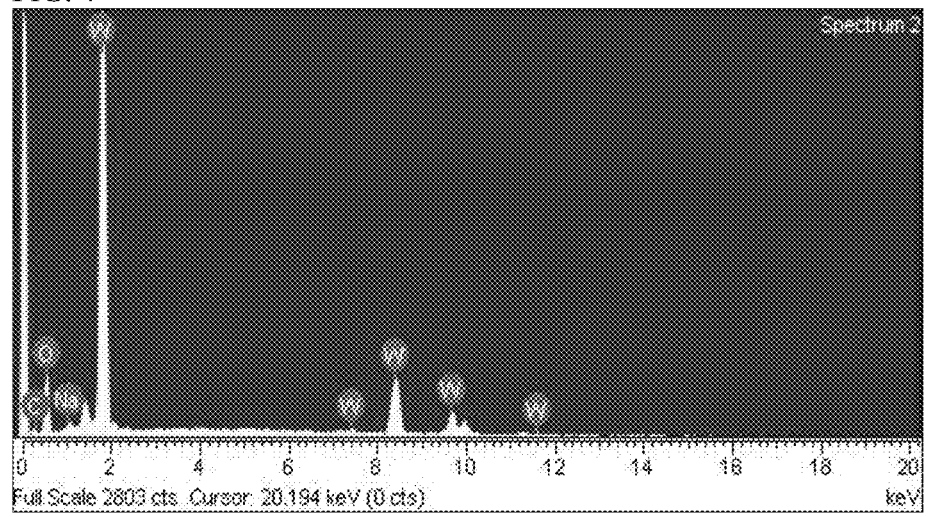
FIG. 4 is an EDX spectrum of a graphene-$WO_3$— $Ni_3B/Ni(OH)_2$ composite photocatalyst having 2.0 wt % $Ni_3B/Ni(OH)_2$.

EDX analysis was used to determine the purity, elemental composition, and fraction of prepared photocatalysts. The well characterized and prominent peaks related to tungsten (W), graphene (C), and oxygen (O) are depicted in FIG. 4 for WG-4. The prepared nanostructures spectrum affirmed the purity of nanostructures and existence of all components containing W, O, and C. The atomic proportion of W, O, and C were clearly shown, which confirmed that the measured sample was non-stoichiometric having an oxygen deficiency. This oxygen deficiency could be useful to enhance photocatalytic activity [Su J., et. al., Nano Lett., 2011, 11, 1928-1933, incorporated herein by reference in its entirety].

Example 6

UV-Visible and PL Spectra

Figure 5A:
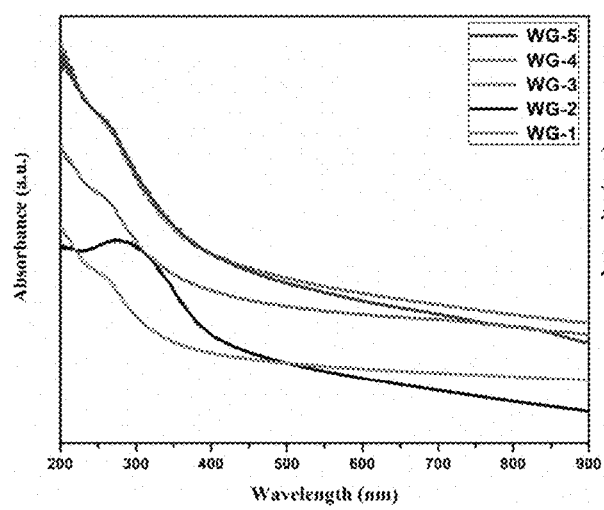
FIGS. 5A-5B depict optical properties of the graphene-WO$_3$—Ni$_3$B/Ni(OH)$_2$ composite photocatalysts where

The absorption spectra of the prepared composite nanostructures in the range 200-900 nm are displayed in FIG. 5A. The experimental results demonstrated that the absorption edge of graphene-$WO_3$ was considerably protracted to higher wavelength in visible-light range with a broad range associated with that of pure $WO_3$. The shift in wavelength occurred because of chemical bonding (W—O—C bond) among prepared graphene, and $WO_3$ nanocomposites that prompted decreasing the band gap energy of $WO_3$ up to optimal mass content of graphene [Guo J., et. al., RSC Adv., 2012, 2, 1356-1363, incorporated herein by reference in its entirety]. The particular absorption-peak of composite WG nanomaterials was found at 292.7 nm. This absorption spectra indicated an improved visible light harvesting material. The bandgap energy was determined by the formula depicted in Equation 2:

$$(\alpha h\upsilon)^2 = A(h\upsilon - Eg)$$

for allowed direct-transitions. The results of band gap calculations are reported in Table 1 below. The results confirmed that the addition of the graphene shows significant improvement the in harvesting of solar energy by the graphene-$WO_3$ photocatalyst, consistent with literature reports [Weng B., et. al., Langmuir, 2014, 30, 5574-5584, incorporated herein by reference in its entirety]. Furthermore, the formation of photogenerated electron-hole pairs at the photocatalyst surface owing to changes in band gap value should to improve photocatalytic activity [Dong S., et. al., RSC Adv., 2015, 5, 14610-14630, incorporated herein by reference in its entirety].

TABLE 1

| Bandgap energy of prepared nanostructures photocatalysts | | | | | |
|---|---|---|---|---|---|
| Prepared Nanostructure | WG-1 | WG-2 | WG-3 | WG-4 | WG-5 |
| Bandgap Energy | 2.51 | 2.53 | 2.48 | 2.41 | 2.3 |

Figure 5B:
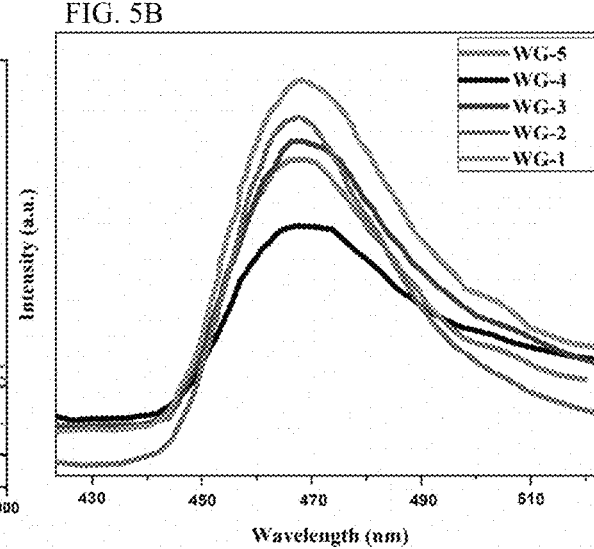
Figure 6A:
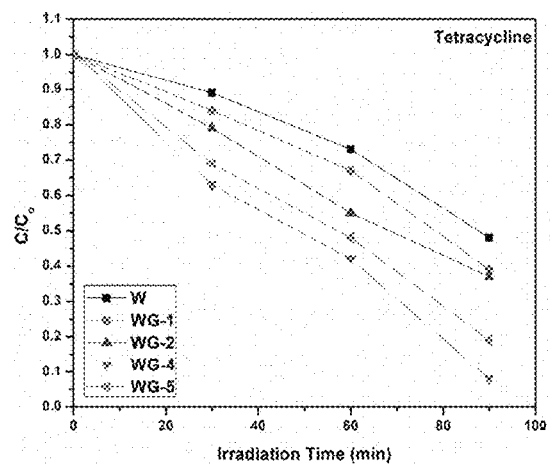
FIGS. 6A-6G are plots of the concentration of various dyes over the course of irradiation in the presence of various samples of the composite photocatalyst where
Figure 6B:
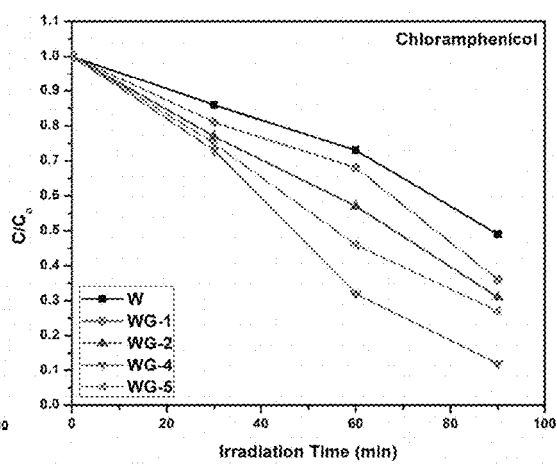
Figure 6C:
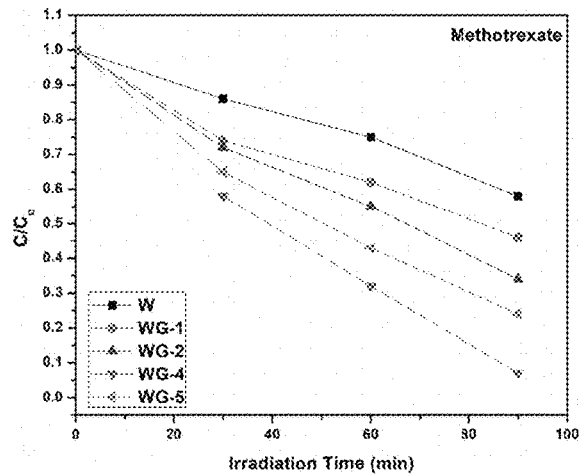
Figure 6D:
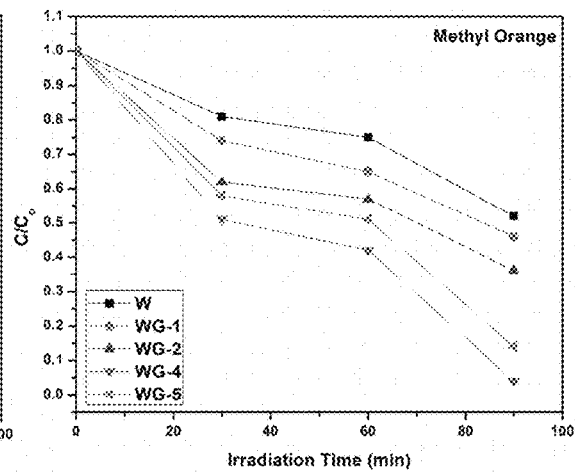
Figure 6E:
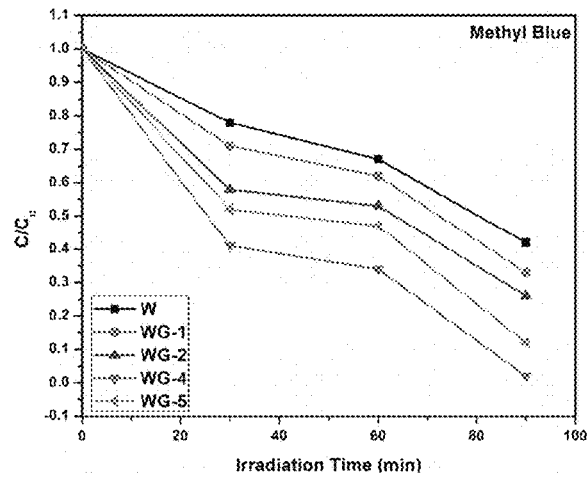
Figure 6F:
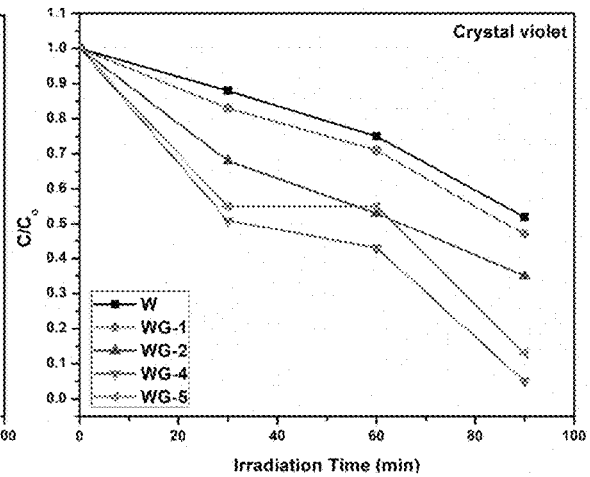
Figure 6G:
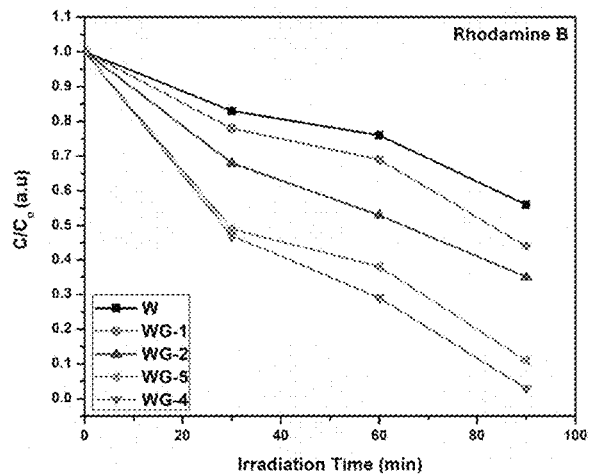

The photoluminescence spectroscopy was performed to investigate the effectiveness of generation, separation, and transmission of electrons in the photocatalyst to determine the fate of charge-carriers in prepared nanostructures [Liu Y., et. al., RSC Adv., 2014, 4, 3219-3225, incorporated herein by reference in its entirety]. The higher intensity of PL emission spectra showed the excessive recombination rate of photogenerated charge carriers. Photoluminescence spectra of $WO_3$ with different ratio of graphene content were shown in FIG. 5B.

It was found that photocatalytic activity was firmly related to photoluminescence emission intensity through the electron transmission efficiency and recombination rate of charge-carriers. Results showed that the intensity of photoluminescence emission became lower after incorporating a specific amount of graphene (4%). However, there was an enhancement in PL intensity with a growing ratio of graphene content (4%) because of the quick rejoining of charge carriers. It was observed that efficient division of charge carriers inhibited the recombination process and enhanced the photocatalytic execution of composite nanostructures when compared to pure $WO_3$. Moreover, it represented the uniform distribution, quantum-size and photocatalyst interactions with mass contents of incorporated graphene.

Example 7

Dyes Degradation by Photocatalytic Activity

Figure 7:
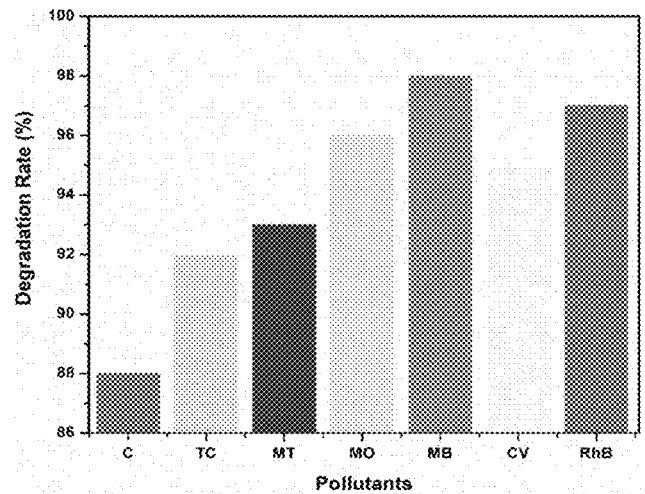
FIG. 7 is a plot of the degradation efficiency for each dye by a graphene-WO$_3$—Ni$_3$B/Ni(OH)$_2$ nanocomposite photocatalyst having 2.0 wt % Ni$_3$B/Ni(OH)$_2$.

The prepared material was examined for dyes degradation under photocatalytic activity using model dyes chloramphenicol (C), tetracycline (TC), methotrexate (MT), methylene orange (MO), methylene blue (MB), crystal violet (CV) and rhodamine-B (RhB) in an aqueous environment under solar energy illumination. FIG. 6A-6G represent the profile of degradation ($C/C_o$) of different dyes as a component of the ideal opportunity for light illumination irradiation. Where, C indicates the concentration of a particular dye after a specific time period of irradiation, and $C_o$ is the initial concentration (irradiation time=0) [Weng B., et. al., Langmuir, 2014, 30, 5574-5584, incorporated herein by reference in its entirety]. It was observed that the synergistic effect of $Ni_3B/Ni(OH)_2$, graphene and $WO_3$ were very promising for the degradation of all dyes through photocatalysis. The % degradation of dyes was observed to be excellent using composite nanostructures in 90 min when compared to pure $WO_3$. The experiment was also performed without using any catalyst to examine the photolysis of dyes. The experimental results illustrated insignificant dye degradation of less than 10% under the same experimental parameters for all dyes. WG-4 sample, among all the prepared samples, showed the excellent photocatalytic activity under solar irradiation. The maximum degradation proficiency of 98% for MB was achieved within 90 min. The photocatalytic activity increased in the order of WG-4>WG-5>WG-3>WG-2>WG-1>W. A plot of the % degradation of each dye after 90 minutes of irradiation is shown for sample WG-4 in FIG. 7. The improved photocatalytic activity was credited to blend of more active sites for photocatalytic reaction from the increased surface area of prepared nanostructures and higher adsorption capacity.

Example 8

Photocatalytic Performance for Water Splitting

Figure 8:
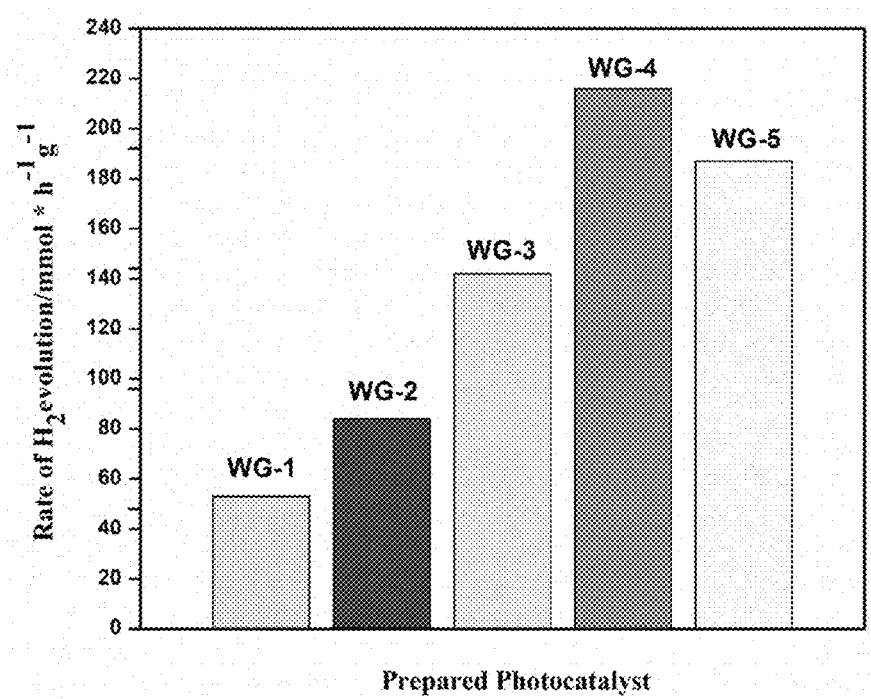
FIG. 8 is a plot of the rate of hydrogen production for prepared composite photocatalysts.

The rate of $H_2$ generation by prepared photocatalysts under visible light irradiation is reported in FIG. 8. The enhanced photocatalytic performance for prepared photocatalysts (WG-1, WG-2, WG-3, WG-4, and WG-5) was studied as compared to nanostructured $WO_3$. The improved proficiency of $H_2$ generation for composite photocatalyst was found up to 4% mass content of graphene in $WO_3$. The charge carriers inside were separated via large induced self-electric field process that behaved as an excellent photocatalyst before recombination occurred. Additionally, further increase in the content of $Ni_3B/Ni(OH)_2$ in the composite reduced their catalytic performance for $H_2$ production. Composite nanomaterials improved the photocatalytic activity by the generation of electron-hole pairs as the content of $Ni_3B/Ni(OH)_2$ was increased in $WO_3$/graphene. Whereas, further increasing graphene content in the composite photocatalysts would reduce the photocatalytic activity. The active sites for $H_2$ production were provided by conduction band of $WO_3$ as well as doping element's surface attributed active sites, which increased photocatalytic reaction. In the composite photocatalyst, the CB of $WO_3$ is lowered due to incorporation of $Ni_3B/Ni(OH)_2$ that transferred negative charge carriers to CB. The incorporated graphene and $Ni_3B/Ni(OH)_2$ atoms ensured quick transfer of negative charge carriers from $WO_3$ to catch positively charged holes for $H_2$ generation. Consequently, the enhanced photocatalytic activity of composite photocatalysts was found because of their higher surface area, high production of charge carriers, and highly active catalytic sites through incorporation of $Ni_3B/Ni(OH)_2$.

The invention claimed is:

1. A composite photocatalyst comprising:
   catalytic nanoparticles comprising tungsten oxide and graphene; and
   co-catalyst nanoparticles comprising a transition metal boride and a transition metal hydroxide disposed upon the catalytic nanoparticles.

2. The composite photocatalyst of claim 1, wherein the tungsten oxide is monoclinic $WO_3$.

3. The composite photocatalyst of claim 1, wherein the tungsten oxide is crystalline by PXRD and has a mean crystallite size of 0.5 to 25 nm by PXRD.

4. The composite photocatalyst of claim 1, wherein the graphene is present in the catalytic nanoparticles in an amount of 0.25 to 10 wt %, based on a total weight of the catalytic nanoparticles.

5. The composite photocatalyst of claim 1, wherein the transition metal boride has a formula of $M_3B$ where M is a transition metal.

6. The composite photocatalyst of claim 5, wherein the transition metal boride is nickel boride having a formula of $Ni_3B$.

7. The composite photocatalyst of claim 1, wherein the transition metal hydroxide has a formula $M'(OH)_2$ where M' is a transition metal.

8. The composite photocatalyst of claim 7, wherein the transition metal hydroxide is nickel hydroxide having a formula of $Ni(OH)_2$.

9. The composite photocatalyst of claim 1, wherein the co-catalytic nanoparticles are present in an amount of 0.25 to 10 wt % based on a total weight of composite photocatalyst.

10. The composite photocatalyst of claim 1, wherein the composite photocatalyst is in the form of particles having a mean particle size of 2 to 150 nm by electron microscopy.

11. The composite photocatalyst of claim 1, having a BET surface area of 75 to 150 $m^2/g$ and a mean pore volume of 0.05 to 0.15 $cm^3g^{-1}$.

12. The composite photocatalyst of claim 1, having a band gap of 2.25 to 2.60 eV.

13. A method of preparing the composite photocatalyst of claim 1, the method comprising:
   dispersing the catalytic nanoparticles in a first precursor solution comprising a first transition metal halide;
   adding a reducing agent solution comprising a borohydride reducing agent and a hydroxide base to the first precursor solution and stirring to form a boride-containing product;
   dispersing the boride-containing product in a second precursor solution comprising a second transition metal halide, a hypophosphite salt, and an aminoalcohol to form a photoreaction mixture;
   irradiating the photoreaction mixture with UV and visible light for 5 to 60 minutes to form the composite photocatalyst; and
   collecting the composite photocatalyst.

14. The method of claim 13, wherein:
   the first transition metal halide and second transition metal halide are nickel (II) chloride;
   the borohydride reducing agent is sodium borohydride;
   the hydroxide base is sodium hydroxide;
   the hypophosphite salt is sodium hypophosphite;
   the aminoalcohol is triethanolamine; and
   the photoreaction mixture is irradiated with a xenon lamp operated at a power of 250 to 350 W.

15. A method of degrading an organic pollutant, the method comprising:
   contacting a solution comprising the organic pollutant with the composite photocatalyst of claim 1 to form a catalytic mixture; and
   irradiating the catalytic mixture with visible light for 1 to 180 minutes.

16. The method of claim 15, wherein the organic pollutant is at least one selected from the group consisting of chloramphenicol, tetracycline, methotrexate, methylene orange, methylene blue, crystal violet, and Rhodamine-B.

17. The method of claim 15, wherein the composite photocatalyst is present in the catalytic mixture in an amount of 0.05 to 0.5 mg/mL.

18. The method of claim 15, wherein the organic pollutant is methylene blue, and the method degrades greater than 95% of an initial amount of methylene blue after irradiating for 75 to 105 minutes.

19. A method of producing hydrogen gas comprising:
   exposing a mixture comprising the composite photocatalyst of claim 1 and water to visible light; and
   collecting hydrogen gas.

20. The method of claim 19, wherein the method produces hydrogen gas at a rate of 250 to 750 mmol $H_2$ per hour per gram of composite photocatalyst.

* * * * *